(12) United States Patent
Mosiewicz

(10) Patent No.: US 11,802,572 B2
(45) Date of Patent: Oct. 31, 2023

(54) FAN WITH IMPROVED DUCT

(71) Applicant: R.E.M. Holding S.R.L., Milan (IT)

(72) Inventor: Roberto Eduardo Mosiewicz, Milan (IT)

(73) Assignee: R.E.M. Holding S.R.L., Milan (IT)

( * ) Notice: Subject to any disclaimer, the term of this patent is extended or adjusted under 35 U.S.C. 154(b) by 12 days.

(21) Appl. No.: 17/616,570

(22) PCT Filed: May 7, 2020

(86) PCT No.: PCT/IB2020/054312
§ 371 (c)(1),
(2) Date: Dec. 3, 2021

(87) PCT Pub. No.: WO2020/245674
PCT Pub. Date: Dec. 10, 2020

(65) Prior Publication Data
US 2022/0252080 A1    Aug. 11, 2022

(30) Foreign Application Priority Data

Jun. 4, 2019 (IT) .................. 102019000007935

(51) Int. Cl.
*F04D 29/38* (2006.01)
*F04D 29/54* (2006.01)
(52) U.S. Cl.
CPC ......... *F04D 29/384* (2013.01); *F04D 29/545* (2013.01)
(58) Field of Classification Search
CPC .... F04D 29/384; F04D 29/545; F04D 29/526; F04D 29/164; F04D 29/325; F05D 2210/12
See application file for complete search history.

(56) References Cited

U.S. PATENT DOCUMENTS

| 2,609,053 A * | 9/1952 | Lee .......................... B64C 27/82 416/123 |
| 5,634,611 A * | 6/1997 | Marze ..................... B64C 27/82 244/17.19 |
| 6,024,537 A * | 2/2000 | Moreau ................. F04D 29/326 416/169 A |
| 10,035,582 B2 | 7/2018 | Vlastuin et al. |
| 2004/0009062 A1* | 1/2004 | Cho ....................... F04D 29/541 415/173.1 |

(Continued)

FOREIGN PATENT DOCUMENTS

| CN | 109 334 952 A | 2/2019 |
| RU | 2232103 C1 | 7/2004 |
| RU | 2645180 C2 | 2/2018 |

OTHER PUBLICATIONS

International Search Report dated Jul. 29, 2020 in corresponding application PCT/IB2020/054312.

(Continued)

*Primary Examiner* — Aaron R Eastman
(74) *Attorney, Agent, or Firm* — Maier & Maier, PLLC

(57) ABSTRACT

A ducted axial fan. The fan includes a rotor rotatable around an axis X and having a plurality of blades, and a duct suitable for defining a circular section channel developing in an axial direction around the rotor. The duct includes an annular seat circumferentially extending around the rotor, and the blade tips are at least partially received in the annular seat of the duct.

13 Claims, 13 Drawing Sheets

(56) References Cited

U.S. PATENT DOCUMENTS

| | | | | |
|---|---|---|---|---|
| 2005/0074333 A1* | 4/2005 | Iwasaki | ................ | F04D 29/326 |
| | | | | 416/179 |
| 2010/0040458 A1* | 2/2010 | Bushnell | ............... | F04D 29/164 |
| | | | | 415/173.6 |
| 2010/0068028 A1* | 3/2010 | Bushnell | ............... | F04D 29/164 |
| | | | | 415/200 |
| 2017/0152854 A1* | 6/2017 | Gebert | ................. | F04D 29/541 |
| 2022/0316496 A1* | 10/2022 | Froh | .................... | F04D 29/526 |

OTHER PUBLICATIONS

Office Action dated Jul. 20, 2023, in corresponding Russian Application No. 2021135626, 7 pages.

Search Report dated Jul. 20, 2023, in corresponding Russian Application No. 2021135626, 4 pages.

* cited by examiner

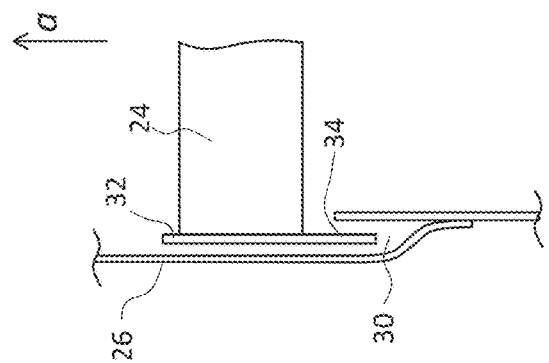
Fig. 4.b
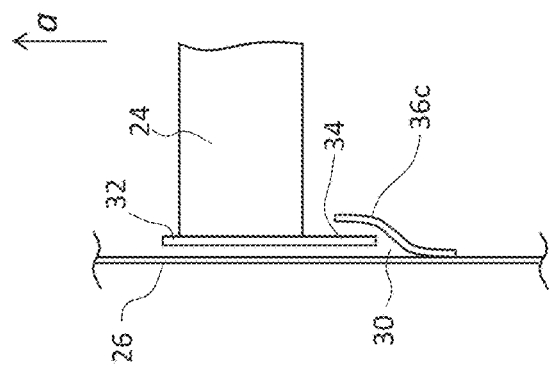
Fig. 4.a
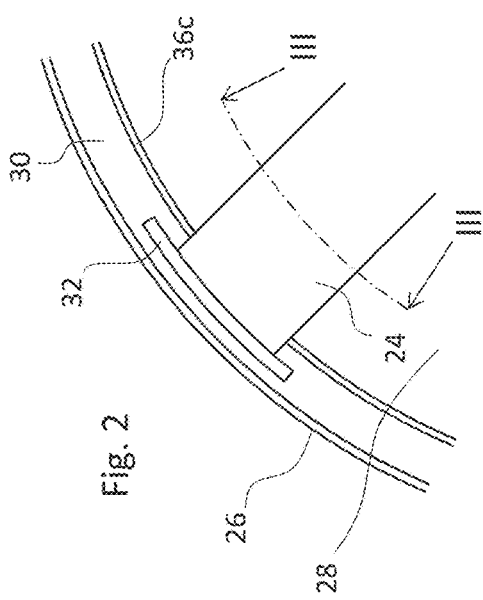
Fig. 2
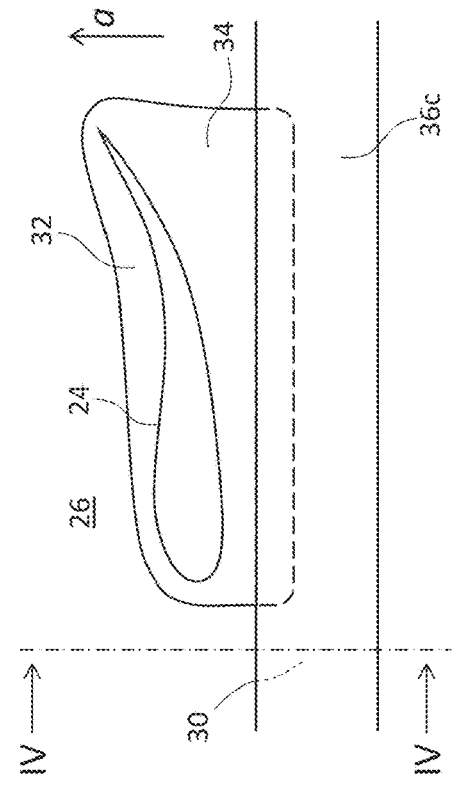
Fig. 3

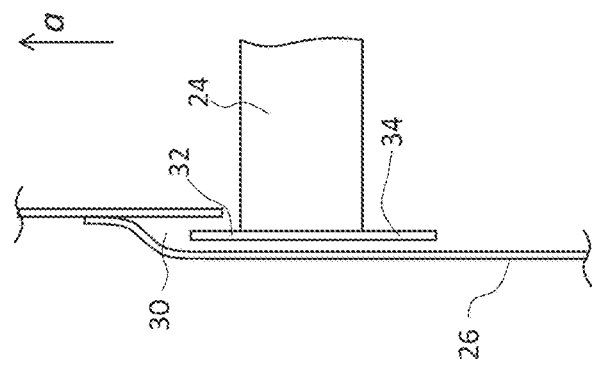
Fig. 4.f
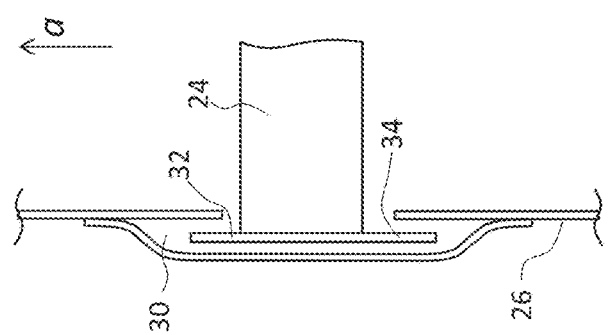
Fig. 4.e
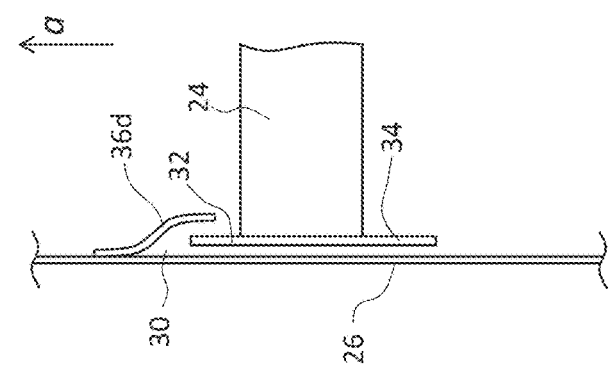
Fig. 4.d
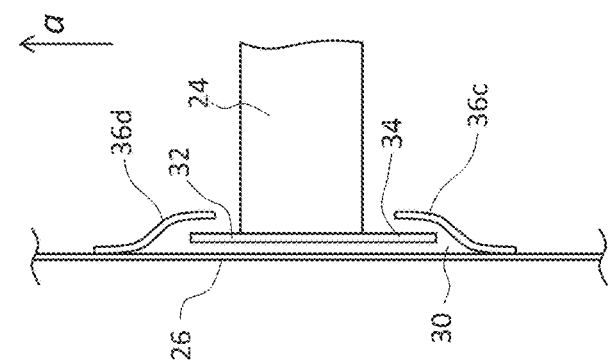
Fig. 4.c

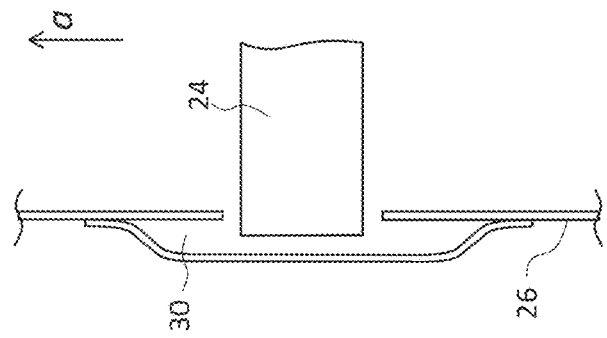
Fig. 4.j
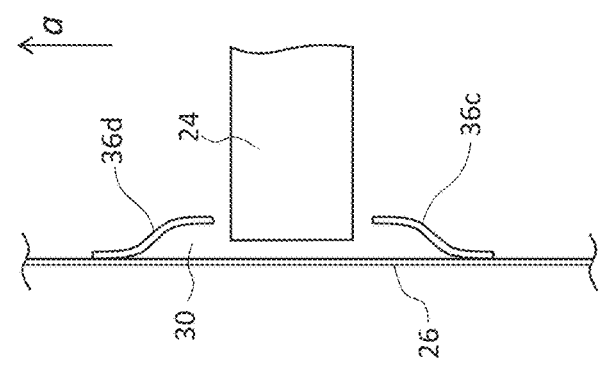
Fig. 4.i
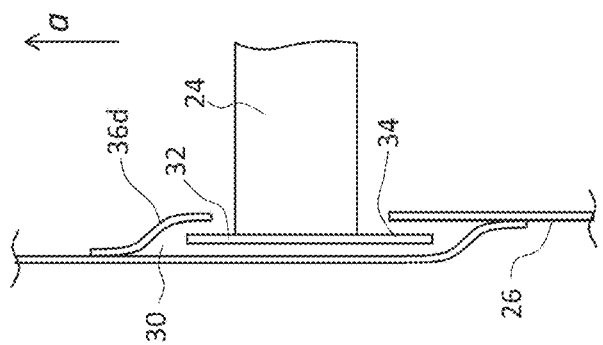
Fig. 4.h
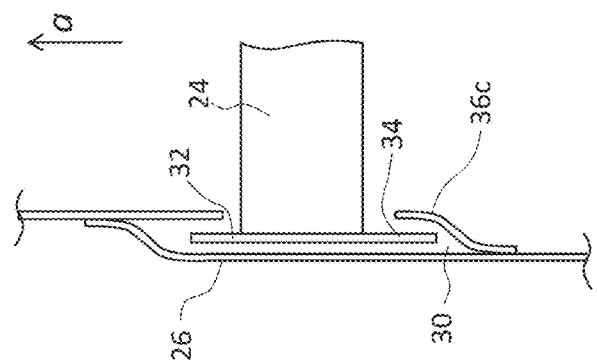
Fig. 4.g

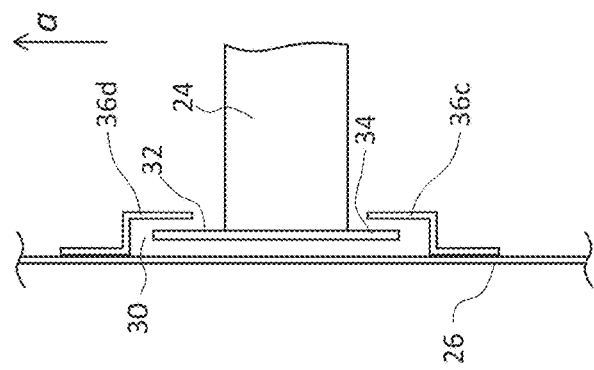
Fig. 4.n
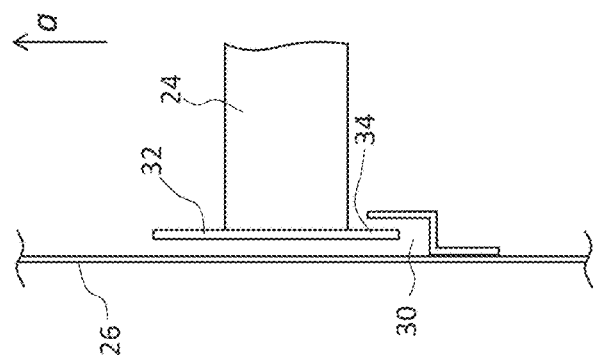
Fig. 4.m
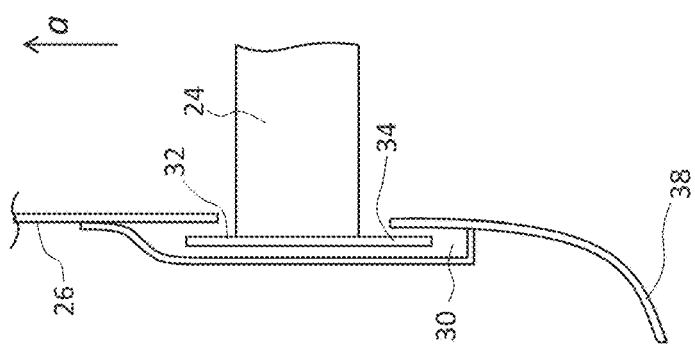
Fig. 4.l
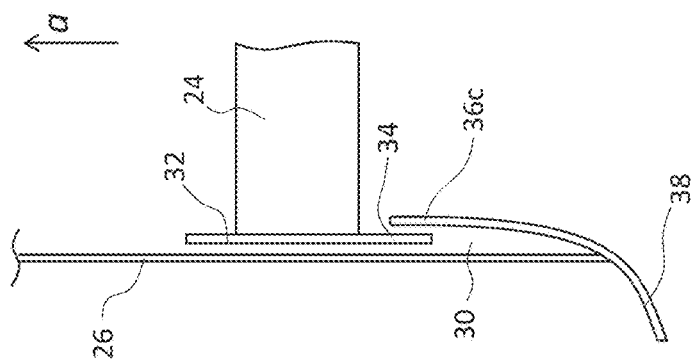
Fig. 4.k

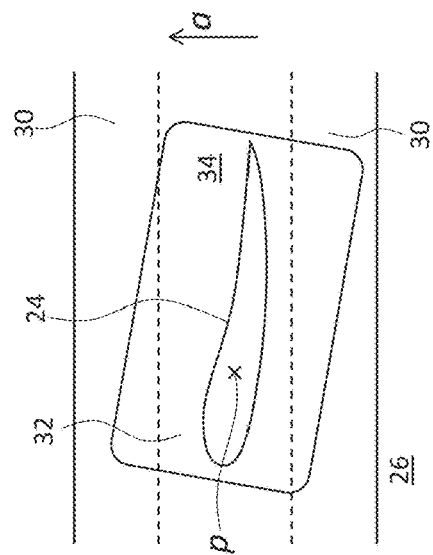
Fig. 15.c
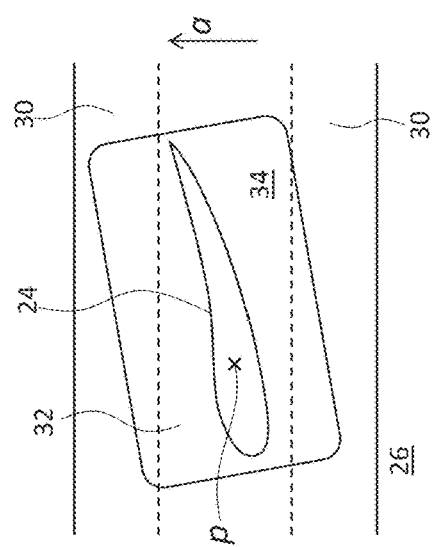
Fig. 15.b
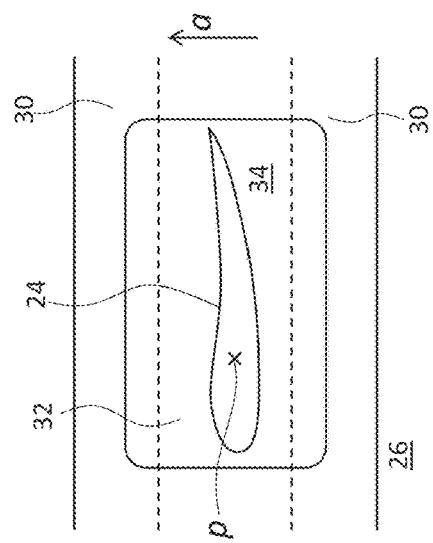
Fig. 15.a

FAN WITH IMPROVED DUCT

BACKGROUND

The present invention relates to a ducted axial fan. This expression refers herein and hereinafter to an axial fan having a diameter Dr greater than 0.5 meters, preferably greater than 1 meter.

In the industrial field, the use of axial fans is known, typically in order to ensure an adequate air flow around special radiating surfaces, in implants that require the dissipation of significant amounts of heat.

Axial fans, e.g. for industrial use, typically comprise a central hub which defines a rotation axis and on which a plurality of blades is mounted. The hub rotation rotates the blades and, as the skilled person can understand, imposes different tangential speeds for the different sections of each blade. In fact, the tangential speed of each blade section is the product of the angular speed (which is the same for all sections) and the radial distance with respect to the rotation axis (which increases moving away from the rotation axis).

For this reason, as is known to the skilled person, the axial fan blades are not able to effectively operate along the entire radial span thereof. The tangential speed of the radially innermost sections of the blade is often too low to achieve effective relative motion with respect to the air flow. It follows that the actual operation of the fan is mainly entrusted to the radially outer sections that guarantee almost all of the total air flow rate generated by the axial fan.

As the skilled person can understand, such flow distribution makes the axial fan as a whole not very efficient. While some technical solutions have been proposed to better exploit the radially inner sections of the blades, there is also a need to improve the efficiency of the radially outer sections. In a manner known per se, in fact, the outer sections are subject to the tip effects that limit their efficiency. As already mentioned, since most of the flow is precisely generated by the radially outer portions, even a small inefficiency in percentage terms in this area results in a great inefficiency in absolute terms for the entire fan.

Along the intermediate portions of an aerodynamic surface, whether it is a wing or, as in this case, a fan blade, the high-pressure air zone and the low-pressure air zone are physically separated from each other by the presence of the blade itself. At the tip of the blade, this separation ceases to exist and therefore an air flow is spontaneously generated that tends to move from the high-pressure zone to the low-pressure zone. In this way a tip vortex is generated which induces an important resistance to the advancement of the blade in the air.

A first solution proposed for this type of problem was to duct the fan, thus confining it inside a shroud with a diameter slightly greater than the outer diameter of the fan itself. This shroud is referred to below as duct.

With the addition of the duct the dimensions of the tip vortexes are significantly reduced, and consequently the amounts of air moved by these vortexes and therefore the induced resistance are reduced. However, as the skilled person can well understand, not only it is impossible to zero the distance between the tip of the blades and the inner diameter of the duct, but such distance cannot even be reduced beyond a certain limit. In fact, any contact between the duct and the blade tips must be avoided in the most absolute way and a safe distance must be provided for this purpose. Therefore, because of their size and the cost they have to maintain, the blades cannot be made with precision tolerances. In addition, the blades may be subjected to vibratory phenomena and may be deformed during operation. Even in the presence of an optimal duct, the tip vortexes cannot therefore be eliminated.

Another solution, borrowed from the aeronautics, is to provide an accessory surface, called wingtip device or winglet, at the tip of each blade. First of all, the winglet has the function of constituting a baffle that opposes the air motion, thus counteracting the formation of the tip vortex. In addition, depending on the shapes adopted, the winglet can also affect the residual tip vortex, optimizing it and thus limiting noise formation.

These solutions, although widely appreciated, are not without drawbacks. In fact, despite the arrangement of the duct and winglets, possibly also in addition to each other, the formation of the tip vortexes remains to some extent inevitable. Thus, the efficiency of the axial fans remains limited.

SUMMARY

Therefore, the object of the present invention is to overcome the drawbacks underlined above with respect to the prior art.

In particular, a task of the present invention is to provide a ducted axial fan which has an improved efficiency.

Furthermore, it is a task of the present invention to provide a ducted axial fan that limits the formation of tip vortexes more than known type fans.

Furthermore, it is a task of the present invention to provide a ducted axial fan which, in addition to introducing further advantages, also maintains the advantages already obtained from known type fans.

Such object and tasks are achieved by means of a ducted axial fan according with claim 1 as disclosed herein.

BRIEF DESCRIPTION OF THE DRAWINGS

To better understand the invention and appreciate its advantages, some of its exemplary and non-limiting embodiments are described below with reference to the accompanying drawings, wherein:

FIG. 2 schematically represents an enlarged view of the detail referred to as II in FIG. 1;

FIG. 3 schematically represents a sectional view made along the line III-Ill of FIG. 2;

FIG. 4.*a* schematically represents a sectional view made along the line IV-IV of FIG. 3;

FIGS. 4.*b* to 4.*n* schematically represent views of some alternative sections, similar to that of FIG. 4.*a;*

FIG. 15 represent a sectional view made along the line XV-XV of FIG. 14, in three different configurations.

DETAILED DESCRIPTION

Figure 1:
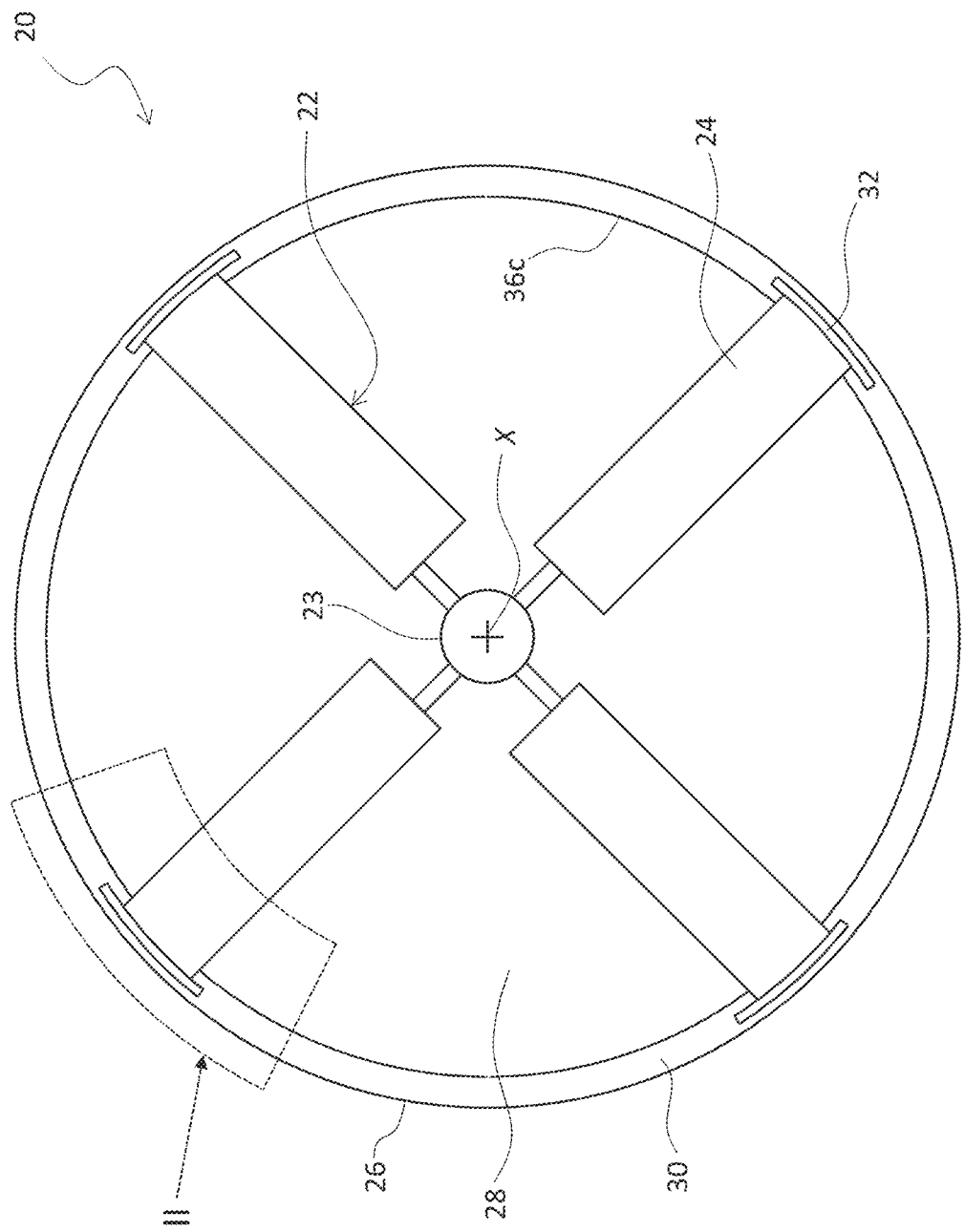
FIG. 1 schematically represents a plan view of a fan according to the present invention.

In the context of the present discussion, some terminological conventions have been adopted in order to make reading easier and smoother. These terminological conventions are clarified below with reference to the appended figures.

The term "duct" hereinafter refers to the side wall or shroud, usually cylindrical, which surrounds the ducted fan creating a channel within which the air flow is constrained.

The fan according to the invention is intended to create an air flow directed from an intake zone (below in the accompanying drawings) to an output zone (above in the accompanying drawings). It is therefore understood that in relation to the flow direction (indicated with a in the drawings) the terms "upstream", "preceding", and the like, with respect to the terms "downstream", "next", and the like, are unequivocally defined.

The terms "converging" and "diverging" should also be interpreted in relation to the flow direction a.

Since the fan according to the invention univocally defines a rotation axis X, in relation to this axis the terms "axial", "radial", "tangential" and "circumferential" are defined.

"Slightly" different quantities are described below. The adverb "slightly" is intended to indicate differences within 10% of the higher quantity between the two, preferably within 5% of the higher quantity between the two.

The invention relates to a ducted axial fan, indicated below as a whole with 20. The fan 20 comprises:

a rotor 22 rotatable around an axis X and comprising a plurality of blades 24; and a duct 26 suitable for defining a circular section channel 28 developing in an axial direction around the rotor 22.

In the fan 20 according to the invention, the duct 26 comprises an annular seat 30 which circumferentially extends around the rotor 22; and the tips of the blades 24 are at least partially received in the annular seat 30 of the duct 26.

Figure 9:
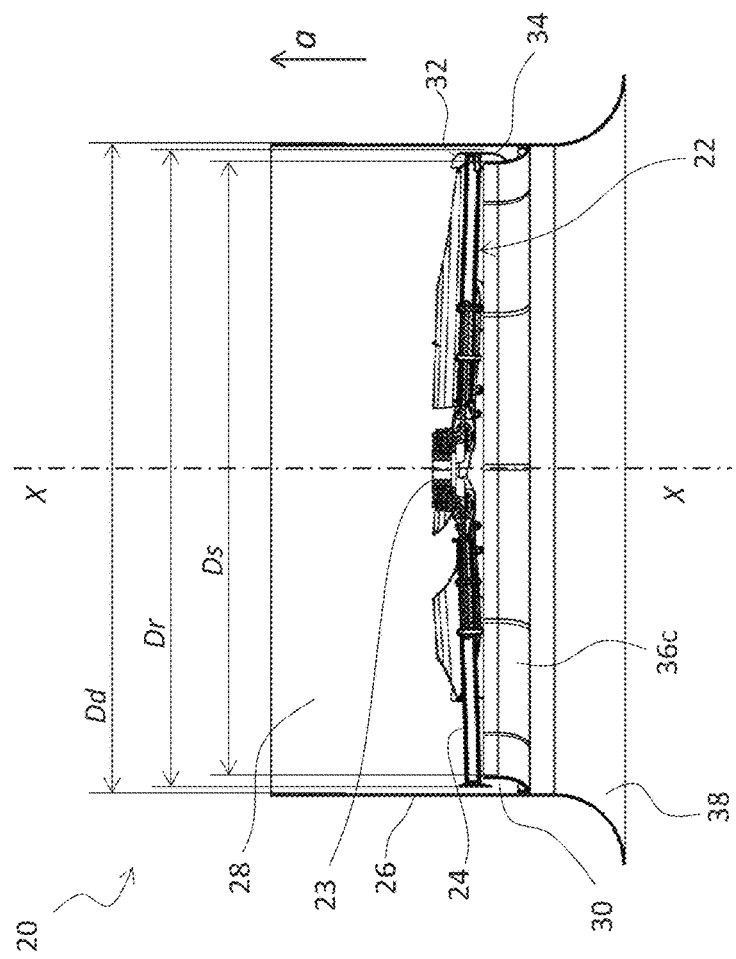
FIG. 9 represents a sectional view made along the line IX-IX of FIG. 7.

That is, at the annular seat 30, the outer diameter Dr of the rotor 22 is greater than the inner diameter Ds of the annular seat 30 (see for example FIG. 9).

By way of example, the outer diameter Dr of the rotor 22 is greater than 0.5 meters, preferably greater than 1 meter.

Preferably, the rotor 22 of the fan 20 comprises a hub 23 defining the rotation axis X. A plurality of blades 24 is mounted on the hub 23.

Preferably the blades 24 are made structurally independent from the hub 23 and are subsequently mounted on the hub 23 so as to be able to vary the pitch according to the specific design needs. Preferably, the blades 24 are mounted onto the hub 23 by bolts (see e.g. FIG. 6).

Preferably, at least one blade 24 of the fan 20 comprises a tip winglet 32, also referred to simply as winglet 32. Winglet 32 is a per se known device that is arranged at the tip of the blades 24 to reduce their noise and to reduce the resistance induced by the formation of tip vortexes. Preferably, the winglet 32 has a baffle 34 at least partially extending in the axial direction. Advantageously, the main development of the baffle 34 of the winglet 32 follows a surface defined by the axial direction and the circumferential or tangential direction.

A duct of the known type has a circular cylindrical shape at least in the axial segment comprising the rotor. Furthermore, in a manner known per se, the duct has an inner diameter slightly greater than the outer diameter of the relative rotor.

The duct 26 according to the invention, and in particular the annular seat 30 thereof, may take on different configurations, depending on the embodiments.

According to some embodiments, the duct 26 has a circular cylindrical shape in the axial segment comprising the rotor 22 and has an inner diameter Dd slightly greater than the outer diameter Dr of the rotor 22.

According to other embodiments, the duct 26 has a circular cylindrical shape and in the segment immediately upstream of the rotor 22 has an inner diameter slightly smaller than the outer diameter Dr of the rotor 22. In these embodiments the duct 26 is then interrupted near the rotor 22, where the annular seat 30 is arranged. In this case, upstream of the rotor 22, the inner diameter of the duct 26 coincides with the inner diameter Ds of the annular seat 30. Downstream of the rotor 22, in some embodiments the duct 26 assumes an inner diameter Dd slightly larger than the outer diameter of the rotor 22, while in other embodiments the duct 26 again assumes an inner diameter Ds slightly smaller than the outer diameter of the rotor 22.

According to some embodiments, the duct 26 has a circular cylindrical shape and in the segment immediately upstream of the rotor 22 and in correspondence of the rotor 22 (i.e. where the annular seat 30 is arranged) has an inner diameter Dd slightly greater than the outer diameter Dr of the rotor 22. In certain such embodiments the duct 26 continues downstream of the rotor 22 with an inner diameter slightly smaller than the outer diameter of the rotor 22. In this case, downstream of the rotor 22, the inner diameter of the duct 26 coincides with the inner diameter Ds of the annular seat 30.

According to some embodiments, the annular seat 30 comprises an aerodynamic smoothing surface 36. For example, the annular seat 30 may comprise a converging aerodynamic smoothing surface 36c, preferably arranged immediately upstream of the rotor 22. Alternatively or additionally, the annular seat 30 may comprise a divergent aerodynamic smoothing surface 36d, preferably arranged immediately downstream of the rotor 22.

According to some embodiments, the aerodynamic smoothing surface 36 (converging 36c and/or diverging 36d) determines a narrowing in the channel 28 defined by the duct 26.

According to some embodiments, the annular seat 30 is open in the axial direction. For example, the annular seat 30 may be axially open upstream (i.e., towards the intake zone) or downstream (i.e., towards the output zone).

According to some embodiments, the annular seat 30 is radially open towards the inside of the duct 26. Preferably the annular seat 30 extends in the axial direction upstream and/or downstream.

According to some embodiments, the annular seat 30 develops overall outside the duct 26, while in other embodiments the annular seat 30 develops overall inside the duct 26.

According to some embodiments, at least one blade 24 of the fan 20 comprises a tip winglet 32 having a baffle 34 extending in the axial direction. For example, the baffle 34 of the winglet 32 may extend axially upstream, downstream, or both ways. Preferably, each blade 24 comprises a winglet 32.

Figure 6:
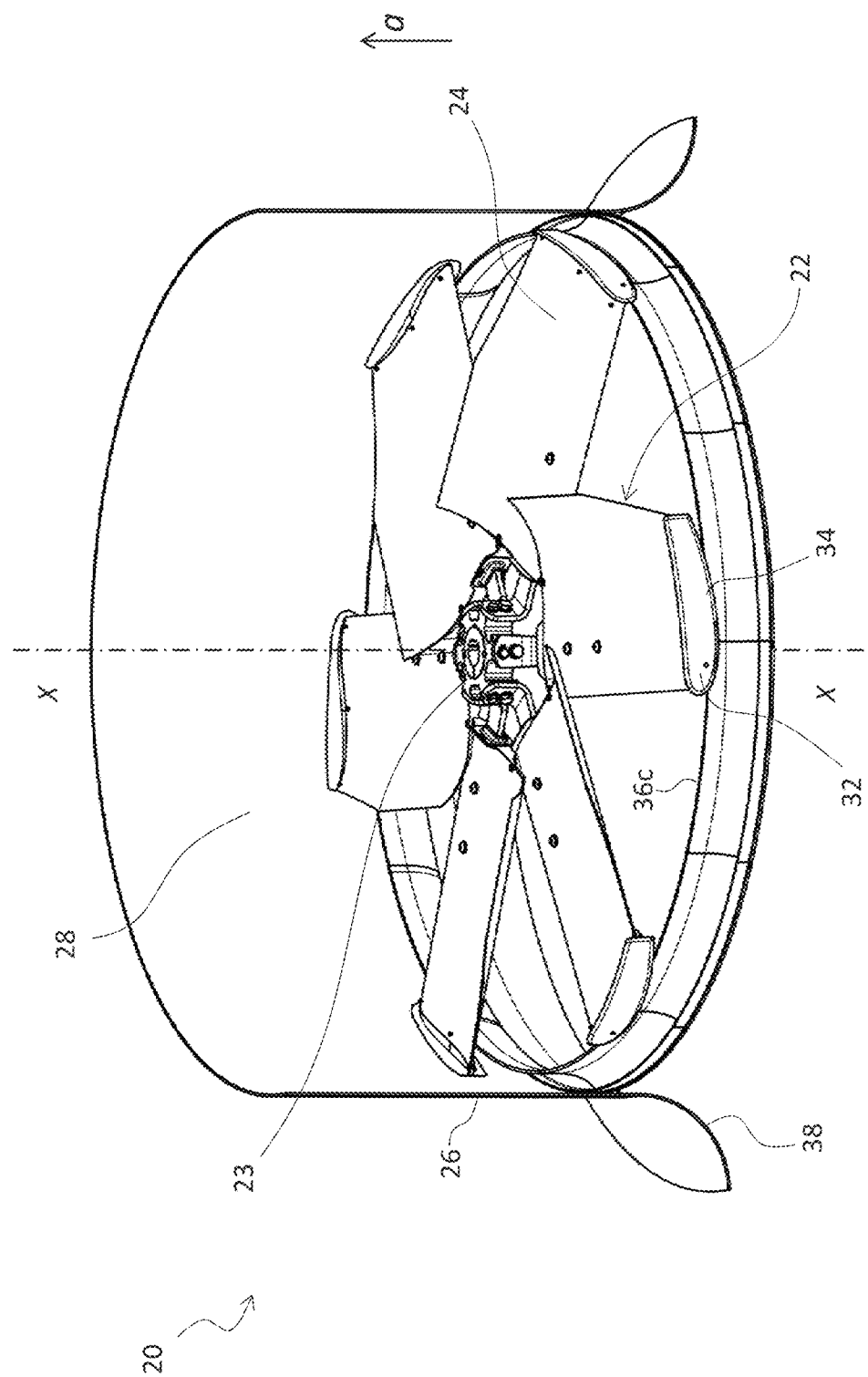
FIG. 6 represents a perspective view of a fan according to the invention, wherein the duct has been partially removed for greater clarity.
Figure 8:
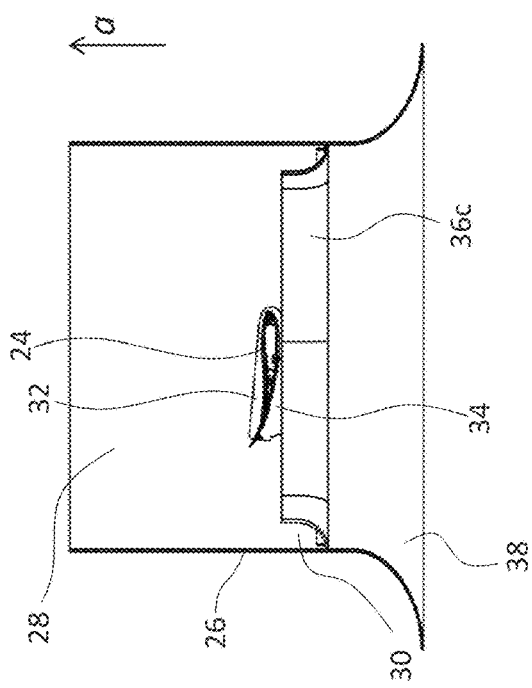
FIG. 8 represents a sectional view made along the line VIII-VIII of FIG. 7.
Figure 11:
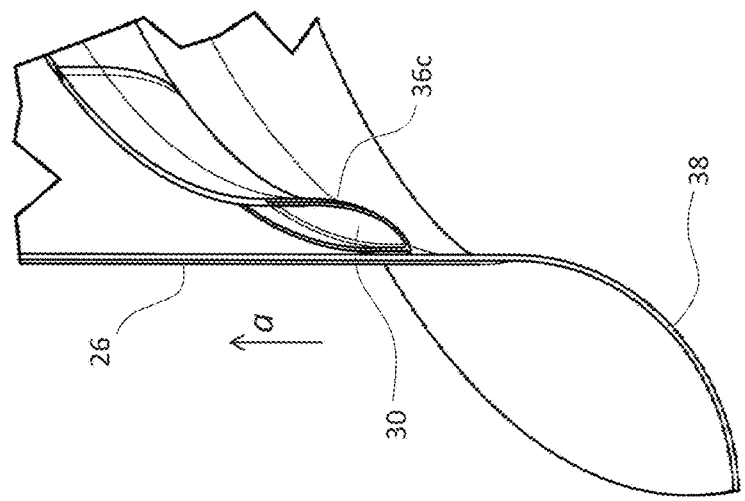
FIG. 11 represents an enlarged view of the detail referred to as XI in FIG. 10.
Figure 10:
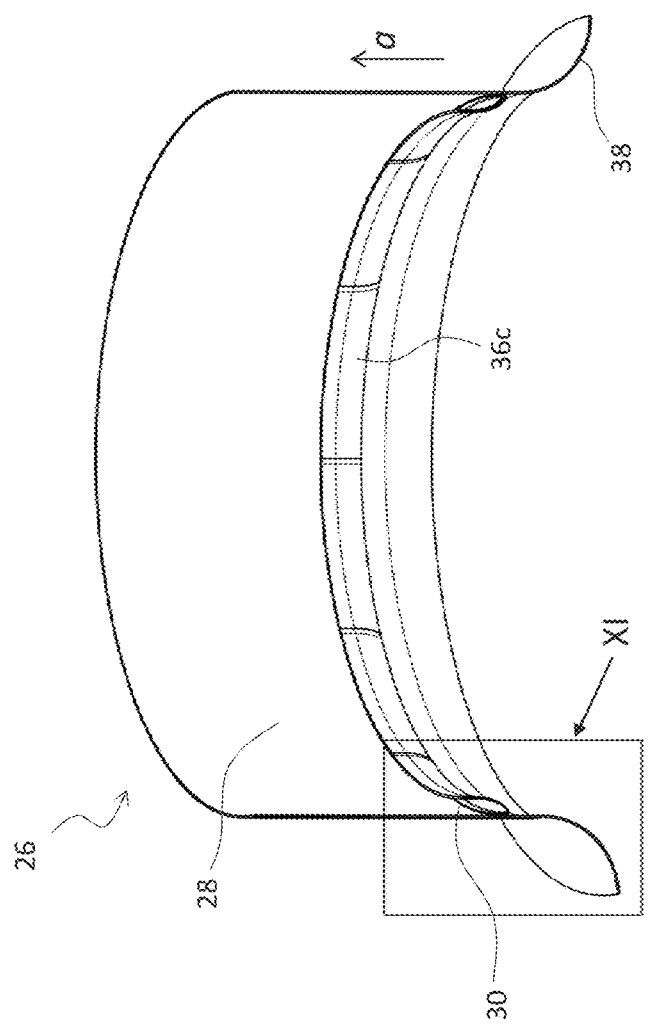
FIG. 10 represents a perspective view of part of a fan duct according to the invention.

The winglet 32 may take different shapes. FIG. 6 shows for example a rotor 22 comprising known type winglets 32, which baffle 34 has a rather small extension in the axial direction. Other conformations of the winglet 32 are shown in FIGS. 3 and 8. In these cases, it is noted that the axial extension upstream of the winglet 32 is greater and is wider in the tangential direction (i.e. along the chord of the blade 24 airfoil). In the fan 20 according to the invention, this type of winglet 32 with greater axial extension allows for greater engagement of the annular seat 30.

In certain embodiments, the duct 26 of the fan 20 according to the invention comprises a converging mouth 38. In a per se known manner, the converging mouth 38 is defined at the upstream end of the duct 26 and serves the function of receiving the air flow into the intake zone and gently conveying it to the rotor 22. In the embodiments of FIGS. 5, 6 and 8-11, the converging mouth 38 is defined in a per se known manner by the wall of the duct 26 itself. According to other schematic embodiments for example in FIGS. 4.*k* and 4.*l*, the converging mouth 38 is defined by an upstream protrusion of the aerodynamic smoothing surface 36, in particular of the converging aerodynamic smoothing surface 36*c*.

In the embodiment schematically shown in FIG. 4.*a*, the duct 26 has a circular cylindrical shape in the axial segment comprising the rotor 22 and has an inner diameter Dd slightly greater than the outer diameter Dr of the rotor 22. In such embodiment, the annular seat 30 is thus obtained from a traditional duct 26 by adding an aerodynamic smoothing surface 36. In particular, a converging aerodynamic smoothing surface 36*c* is arranged, immediately upstream of the rotor 22. The converging aerodynamic smoothing surface 36*c* thus causes a narrowing in the channel 28 included in the duct 26, such that the inner diameter Ds of the annular seat 30 is slightly smaller than the outer diameter Dr of the rotor 22. Due to the shape of the converging aerodynamic smoothing surface 36*c*, the annular seat 30 is axially open downstream. The blade 24 includes a tip winglet 32 with a baffle 34 axially extending upstream and being received in the annular seat 30.

In the embodiment schematically shown in FIG. 4.*b*, the duct 26 has a circular cylindrical shape and in the segment immediately upstream of the rotor 22 has an inner diameter slightly smaller than the outer diameter Dr of the rotor 22. In this case, upstream of the rotor 22, the inner diameter of the duct 26 coincides with the inner diameter Ds of the annular seat 30. The duct 26 then stops near the rotor 22, where the annular seat 30 is arranged, and continues in correspondence and downstream of the rotor 22 with an inner diameter Dd slightly greater than the outer diameter Dr of the rotor 22. Due to the shape of the duct 26, the annular seat 30 is axially open downstream. The blade 24 includes a tip winglet 32 with a baffle 34 axially extending upstream and being received in the annular seat 30.

The embodiment schematically shown in FIG. 4.*c* is very similar to that of FIG. 4.*a*, to the description of which reference is made. In addition, in this embodiment a diverging aerodynamic smoothing surface 36*d* is arranged, immediately downstream of the rotor 22. The resulting annular seat 30 develops overall within the channel 28 of the duct 26. Such annular seat 30 is open in the radial direction towards the inside and extends in the axial direction downstream and upstream. The blade 24 includes a tip winglet 32 with a baffle 34. The tip of the blade 24 is radially received in the annular seat 30 and the baffle 34 of the winglet 32 axially extends downstream and upstream inside the annular seat 30.

In the embodiment schematically shown in FIG. 4.*d* the duct 26 has a circular cylindrical shape in the axial segment comprising the rotor 22 and has an inner diameter Dd slightly greater than the outer diameter Dr of the rotor 22. In such embodiment, the annular seat 30 is thus obtained from a traditional duct 26 by adding an aerodynamic smoothing surface 36. In particular, a diverging aerodynamic smoothing surface 36*d* is arranged, immediately downstream of the rotor 22. The diverging aerodynamic smoothing surface 36*d* thus determines a narrowing in the channel 28 included in the duct 26, such that the inner diameter Ds of the annular seat 30 is slightly smaller than the outer diameter Dr of the rotor 22. Due to the shape of the diverging aerodynamic smoothing surface 36*d*, the annular seat 30 is axially open upstream. The blade 24 includes a tip winglet 32 with a baffle 34 axially extending downstream and being received in the annular seat 30.

In the embodiment schematically depicted in FIG. 4.*e*, the duct 26 has a circular cylindrical shape and in the segment immediately upstream and immediately downstream of the rotor 22 has an inner diameter slightly smaller than the outer diameter Dr of the rotor 22. In this case, the inner diameter of the duct 26 coincides with the inner diameter Ds of the annular seat 30. The duct 26 is then interrupted near the rotor 22, where the annular seat 30 is arranged. The resulting annular seat 30 develops overall outside the channel 28 of the duct 26. Such annular seat 30 is open in the radial direction towards the inside and extends in the axial direction downstream and upstream. The blade 24 includes a tip winglet 32 with a baffle 34. The tip of the blade 24 is radially received in the annular seat 30 and the baffle 34 of the winglet 32 axially extends downstream and upstream inside the annular seat 30.

In the embodiment schematically depicted in FIG. 4.*f*, the duct 26 assumes a shape similar to that obtained by reversing the duct 26 of FIG. 4.*b*. The duct 26 has a circular cylindrical shape and in the segment immediately upstream of the rotor 22 and in correspondence of the rotor 22, where the annular seat 30 is arranged, has an inner diameter Dd slightly greater than the outer diameter Dr of the rotor 22. The duct 26 continues downstream of the rotor 22 with an inner diameter slightly smaller than the outer diameter of the rotor 22. In this case, downstream of the rotor 22, the inner diameter of the duct 26 coincides with the inner diameter Ds of the annular seat 30. Due to the shape of the duct 26, the annular seat 30 is axially open upstream. The blade 24 includes a tip winglet 32 with a baffle 34 axially extending downstream and being received in the annular seat 30.

The embodiment schematically shown in FIG. 4.*g* is very similar to that of FIG. 4.*f*, to the description of which reference is made. In addition, in this embodiment a converging aerodynamic smoothing surface 36*c* is arranged, immediately upstream of the rotor 22. The resulting annular seat 30 is open in the radial direction towards the inside and extends in the axial direction downstream and upstream. The blade 24 includes a tip winglet 32 with a baffle 34. The tip of the blade 24 is radially received in the annular seat 30 and the baffle 34 of the winglet 32 axially extends downstream and upstream inside the annular seat 30.

The embodiment schematically shown in FIG. 4.*h* is very similar to that of FIG. 4.*b*, to the description of which reference is made. In addition, in this embodiment a diverging aerodynamic smoothing surface 36*d* is arranged, immediately downstream of the rotor 22. The resulting annular seat 30 is open in the radial direction towards the inside and extends in the axial direction downstream and upstream. The blade 24 includes a tip winglet 32 with a baffle 34. The tip of the blade 24 is radially received in the annular seat 30 and the baffle 34 of the winglet 32 axially extends downstream and upstream inside the annular seat 30.

The embodiment schematically shown in FIG. 4.*i* is very similar to that of FIG. 4.*c*, to the description of which reference is made. In this embodiment, however, the blade 24 does not comprise any tip winglet 32. The tip of the blade 24 is radially received in the annular seat 30.

The embodiment schematically shown in FIG. 4.*j* is very similar to that of FIG. 4.*e*, to the description of which reference is made. In this embodiment, however, the blade 24 does not comprise any tip winglet 32. The tip of the blade 24 is radially received in the annular seat 30.

In the embodiment schematically shown in FIG. 4.*k* the duct 26 has a circular cylindrical shape in the axial segment comprising the rotor 22 and has an inner diameter Dd slightly greater than the outer diameter Dr of the rotor 22. In such embodiment, the annular seat 30 is thus obtained from a traditional duct 26 by adding an aerodynamic smoothing surface 36. In particular, a converging aerodynamic smoothing surface 36*c* is arranged, immediately upstream of the rotor 22. In addition, the aerodynamic smoothing surface protrudes upstream to form the converging mouth 38. In a manner similar to what is described above relative to FIG. 4.*a*, the converging aerodynamic smoothing surface 36*c* causes a narrowing in the channel 28, the inner diameter Ds of the annular seat 30 is slightly smaller than the outer diameter Dr of the rotor 22, the annular seat 30 is axially open downstream. The blade 24 includes a tip winglet 32 with a baffle 34 axially extending upstream and being received in the annular seat 30.

The embodiment schematically shown in FIG. 4.1 is similar to that of FIG. 4.*e*, to the description of which reference is made. In this embodiment, however, the duct 26 wall is shaped so as to form, upstream of the rotor 22, the converging mouth 38.

The embodiment schematically shown in FIG. 4.*m* is very similar to that of FIG. 4.*a*, to the description of which reference is made. In this embodiment, however, the converging aerodynamic smoothing surface 36*c* is not shaped so as to define a soft and continuous narrowing in the channel 28, but is shaped with a sharp-cornered profile that introduces an abrupt step narrowing.

The embodiment schematically shown in FIG. 4.*n* is very similar to that of FIG. 4.*c*, to the description of which reference is made. In this embodiment, however, the converging aerodynamic smoothing surface 36*c* and the diverging aerodynamic smoothing surface 36*d* are not shaped so as to define soft and continuous variations in the channel 28, but are shaped with sharp-cornered profiles introducing abrupt step variations.

These embodiments schematized in FIGS. 4.*m* and 4.*n*, although not aerodynamically optimal, may be advantageous under certain specific conditions for their greater ease of implementation.

The configurations of the duct 26 and annular seat 30 described above with reference to FIG. 4 are shown by way of example. As it will be well understood by the skilled person, the annular seat 30 can take different shapes from those described herein in detail, in order to meet specific needs.

As the skilled person can see by observing FIG. 4, the configuration according to the invention of the annular seat 30 and of the tip of the blade 24, allow obtaining a sort of labyrinth seal. In a manner known per se, a labyrinth seal defines a tortuous path that significantly reduces the spontaneous passage of a fluid from a high-pressure zone to a low-pressure zone. In the specific case, the configuration of the annular seat 30 and of the tip of the blade 24 (with or without winglet 32) define a tortuous path for air that spontaneously tends to flow from the high-pressure zone (above the blade 24) to the low-pressure zone (below the blade 24). By reducing the amount of air passing from one zone to the other at the tip of the blade 24, the magnitude of the tip vortex and, as a result, the induced resistance are reduced.

Figure 5:
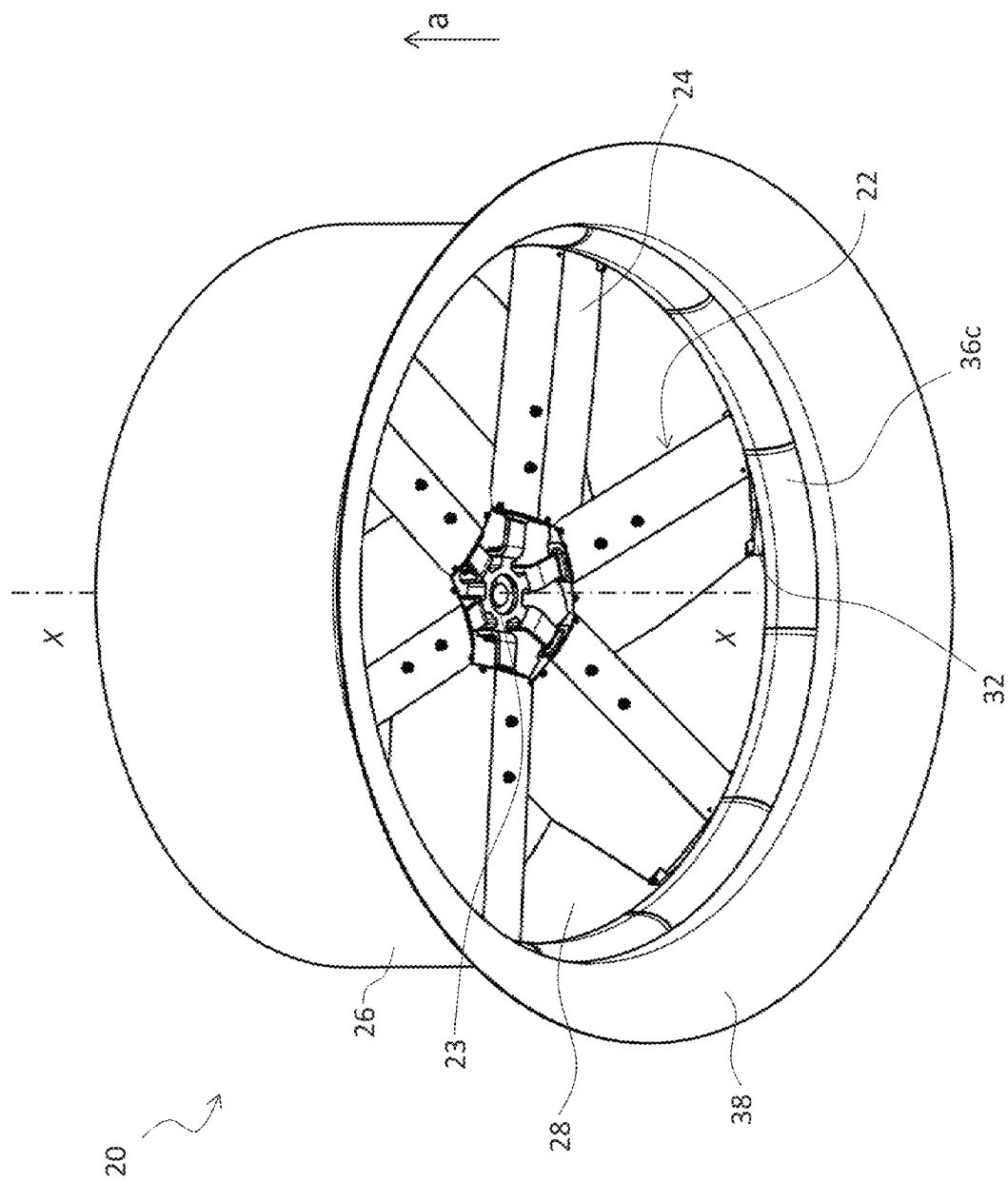
FIG. 5 represents a partially bottom perspective view of a fan according to the invention.
Figure 7:
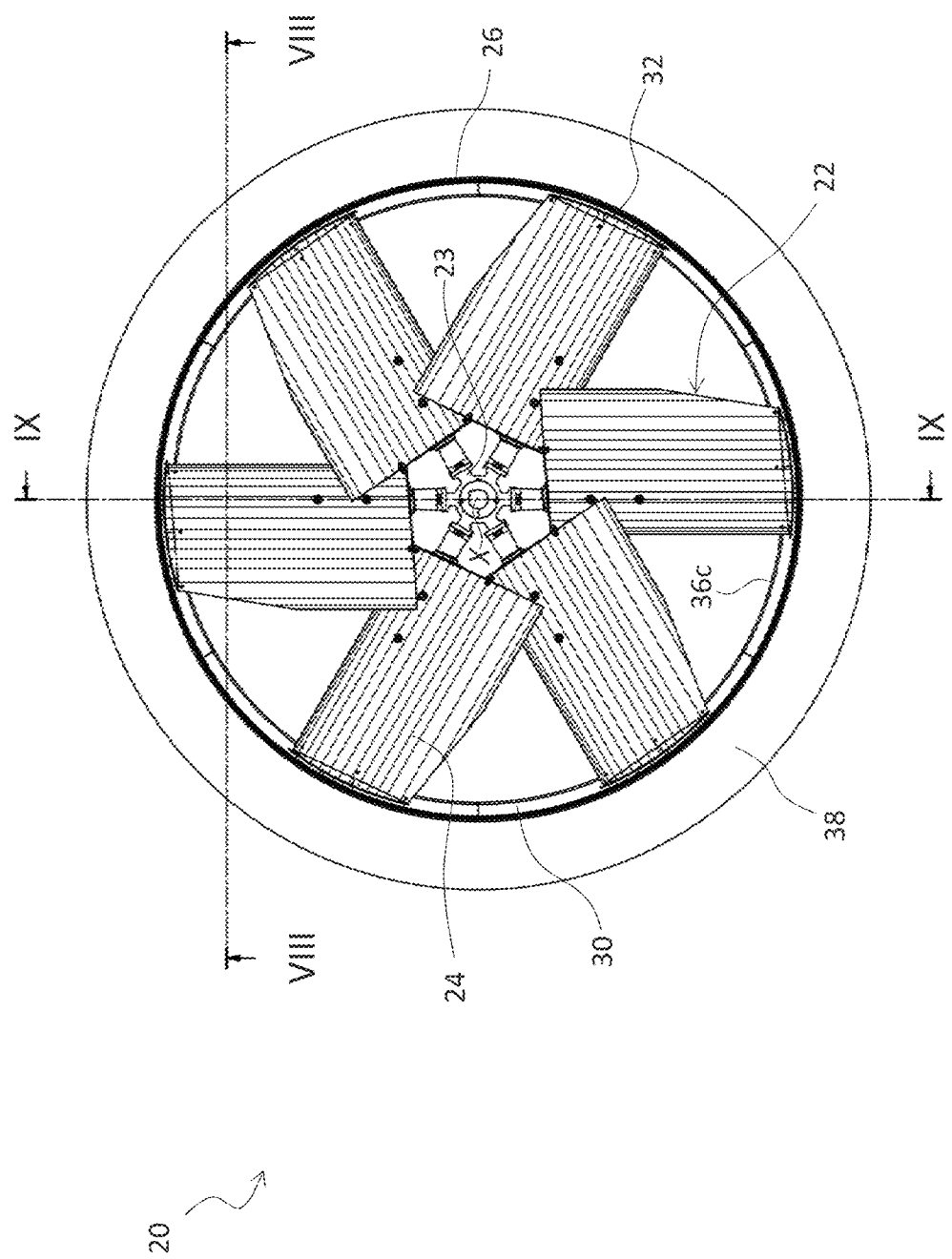
FIG. 7 represents a plan view of another fan according to the invention.

The embodiments of FIGS. 5 to 11 are similar to that schematized in FIG. 4.*a*. More particularly, FIGS. 5 and 6 represent one embodiment of the rotor 22, while FIGS. 7, 8, and 9 represent a different embodiment of the rotor 22. The main difference between the two embodiments consists in the shape and extension of the baffle 34 of the winglet 32. FIG. 6 shows a winglet 32 smaller than that seen in FIG. 8. The duct 26 and annular seat 30 are common to both embodiments and are depicted in more detail in FIGS. 10 and 11.

In the embodiments of FIGS. 5 to 11, the duct 26 has a circular cylindrical shape in the axial segment comprising the rotor 22 and has an inner diameter Dd slightly larger than the outer diameter Dr of the rotor 22 (see FIG. 9). The annular seat 30 is thus obtained from a traditional duct 26 by adding the aerodynamic smoothing surface 36. In particular, the converging aerodynamic smoothing surface 36*c* is arranged, immediately upstream of the rotor 22. The converging aerodynamic smoothing surface 36*c* thus determines a narrowing in the channel 28 included in the duct 26, such that the inner diameter Ds of the annular seat 30 is slightly smaller than the outer diameter Dr of the rotor 22 (see again FIG. 9). Due to the shape of the converging aerodynamic smoothing surface 36*c*, the annular seat 30 is axially open downstream. The blades 24 comprise respective tip winglets 32 that take different shapes, but in any case they have a baffle 34 axially extending upstream and being received in the annular seat 30.

Each of the variants described above allows to obtain some specific advantages, some of which are described below by way of example.

Embodiments comprising a traditional duct 26 to which aerodynamic smoothing surfaces 36 are added allow an existing fan 20 to be modified in order to be in accordance with the invention. Such embodiments are shown in FIGS. 4.*a*, 4.*c*, 4.*d*, 4.*i*, 4.*k*, 4.*m* and 4.*n*, for example.

Embodiments including a narrowing of the channel 28 at the annular seat 30, allow for local acceleration of the air flow. In this regard, it should be noted that the difference between the inner diameter Dd of the duct 26 and the inner diameter Ds of the seat may in some cases reach up to 5% of the inner diameter Dd of the duct 26. In most cases, however, this difference is less than 2% of Dd. Since this reduction is located precisely at the radial periphery, where the flow speed is greater, the local effect of the narrowing on the flow speed is even more evident. Such embodiments are shown in FIGS. 4.*a*, 4.*c*, 4.*d*, 4.*f*, 4.*g*, 4.*i*, 4.*m* and 4.*n*, for example.

Embodiments comprising an enlargement of the channel 28 at the annular seat 30, allow for optimal arrangement of the air flow for applications requiring a diverging outlet at the discharge of the entire duct 26. Such embodiments are shown in FIGS. 4.*b*, 4.*h* and 4.*k*, for example.

Preferably the fan 20 according to the invention also comprises a motor (not shown) suitable for rotating the rotor 22 at the design speed. Furthermore, the fan 20 according to the invention preferably comprises a structure (not shown) suitable for firmly supporting the duct 26, the rotor 22 and possibly the motor in all operating conditions.

Figure 14:
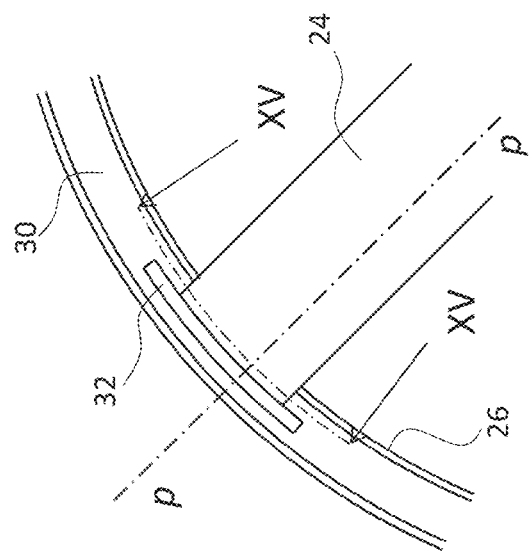
FIG. 14 schematically represents an enlarged view of the detail referred to as XIV in FIG. 13.
Figure 13:
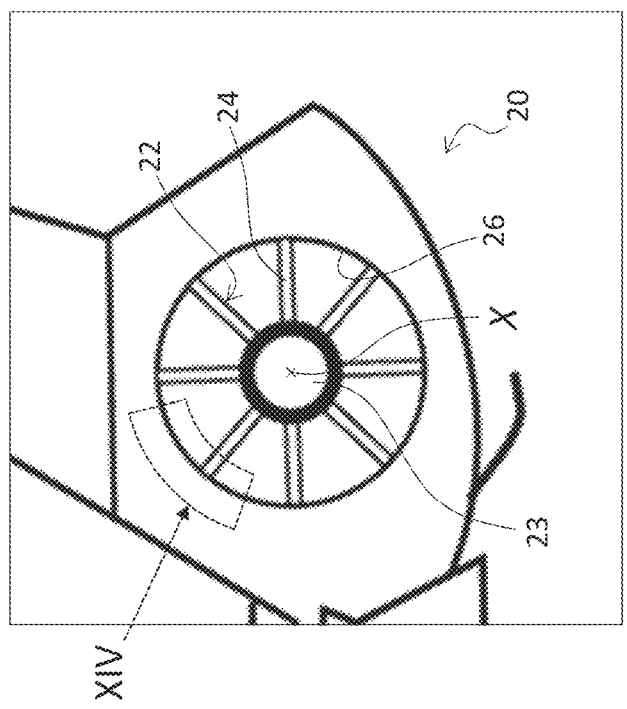
FIG. 13 represents an enlarged view of the detail referred to as XIII in FIG. 12.

According to some embodiments, schematically depicted in FIGS. 14 and 15, the rotor 22 is of the variable pitch type. According to these embodiments, each individual blade 24 may be rotated about an axis p having substantially radial direction. The possibility of simultaneously rotating each blade 24 about the respective axis p allows to modify its incidence with respect to the air (see FIG. 15), thus varying the flow rate of the ducted fan 20 itself. The variable pitch ducted fans 20 thus allow to adapt to different operating conditions and are therefore widely used in various fields.

A field in which variable pitch ducted fans 20 are particularly appreciated is the aeronautical field. Various types of aircraft employ variable pitch ducted fans 20, for example for aircraft propulsion and/or control.

Figure 12:
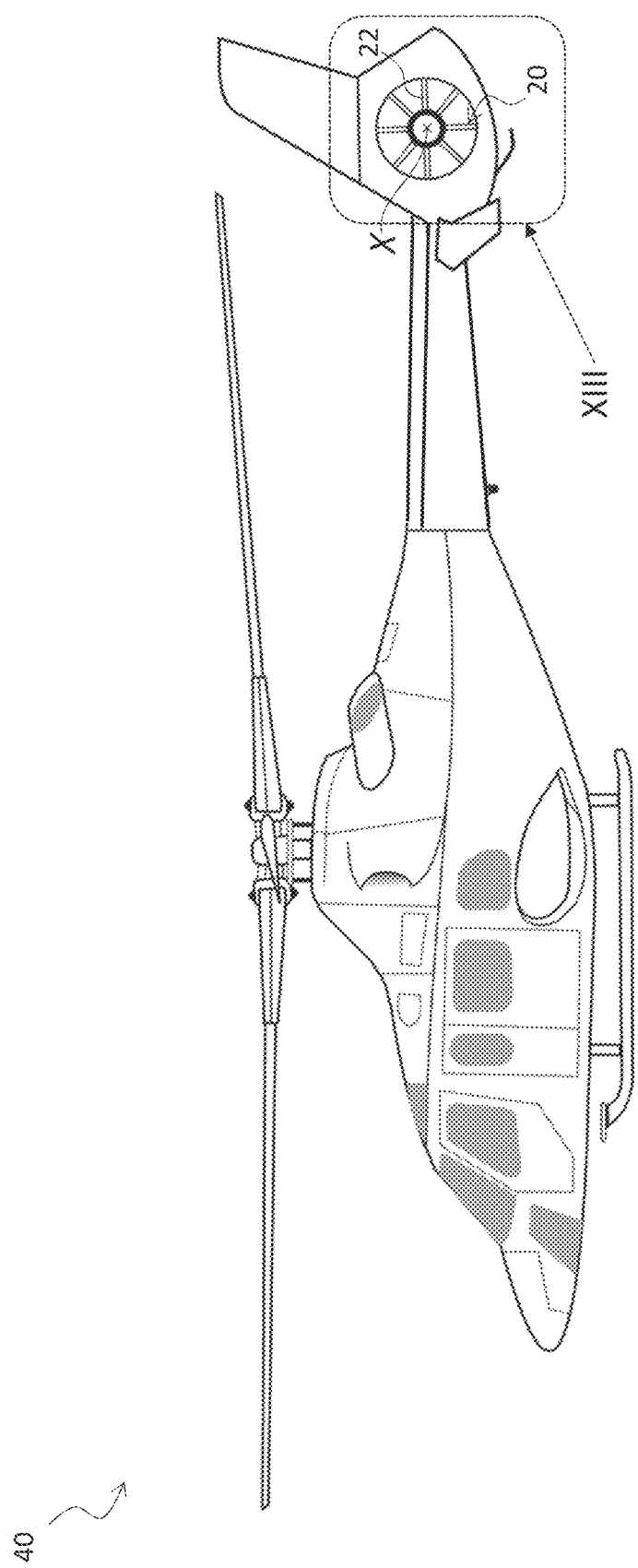
FIG. 12 represents an aircraft comprising a ducted rotor according to the invention.

A particular example of a variable pitch ducted fan 20 is the ducted tail rotor of a helicopter 40 (see by way of example FIG. 12). This solution, also commonly called fenestron, although widely appreciated, has the same drawbacks already identified above for ducted fans for industrial use.

Even in this case, it is particularly advantageous to arrange on the duct 26 an annular seat 30 circumferentially extending around the rotor 22, wherein the tips of the blades 24 are at least partially received in the annular seat 30.

In this type of application, the embodiments schematically depicted in FIGS. 4.c, 4.e, 4.i and 4.j are particularly suitable, although other embodiments may also be usefully employed.

The foregoing description dwells on the technical features that distinguish the invention from prior art solutions. For all the other features, which may be common to the prior art and the invention, reference may be made to the introduction describing and commenting on the prior art.

As the skilled person can easily understand, the invention allows to overcome the drawbacks previously highlighted with reference to the prior art.

In particular, the present invention provides a ducted axial fan which has an improved efficiency.

Furthermore, the present invention provides a ducted axial fan which limits the formation of tip vortexes more than known type fans.

Furthermore, the present invention provides a ducted axial fan which, in addition to introducing further advantages, also maintains the advantages already obtained by known type fans.

It is understood that the specific features are described in relation to different embodiments of the invention by way of non-limiting examples.

Obviously, one skilled in the art will be able to make further modifications and variations to the present invention, in order to meet contingent and specific needs. For example, the technical features described in relation to an embodiment of the invention may be extrapolated from it and applied to other embodiments of the invention. Such modifications and variations are also contained within the scope of the invention, as defined by the following claims.

The invention claimed is:

1. A ducted axial fan, comprising a rotor rotatable around an axis X and comprising:
   a plurality of blades; and
   a duct suitable for defining a circular section channel developing in the axial direction around the rotor;
   wherein the duct comprises an annular seat circumferentially extending around the rotor;
   wherein the tips of the blades are at least partially received in the annular seat of the duct; and
   wherein at least one blade comprises a tip winglet and in that the tip winglet has a baffle;
   wherein a main development of the baffle follows a surface defined by the axial direction and the circumferential direction; and
   wherein the baffle is received in the annular seat.

2. The fan according to claim 1, wherein, in correspondence of the annular seat, the outer diameter of the rotor Dr is larger than the inner diameter Ds of the annular seat.

3. The fan according to claim 1, wherein the annular seat comprises an aerodynamic smoothing surface.

4. The fan according to claim 1, wherein the annular seat comprises a converging aerodynamic smoothing surface placed immediately upstream of the rotor.

5. The fan according to claim 4, wherein the aerodynamic smoothing surface determines a narrowing in the channel defined by the duct.

6. The fan according to claim 5, wherein the narrowing comprises a difference between the inner diameter Dd of the duct and the inner diameter Ds of the annular seat, and wherein such difference is less than 5% of Dd.

7. The fan according to claim 6, wherein the difference is less than 2% of Dd.

8. The fan according to claim 1, wherein the annular seat comprises a diverging aerodynamic smoothing surface placed immediately downstream of the rotor.

9. The fan according to claim 1, wherein the annular seat is axially open downstream.

10. The fan according to claim 1, wherein the baffle axially extends upstream and is received in the annular seat.

11. The fan according to claim 1, further comprising a motor and/or a structure.

12. The fan according to claim 1, wherein the rotor is of the variable pitch type.

13. The fan according to claim 1, wherein the fan is a tail rotor of a helicopter.

* * * * *